Patented Feb. 22, 1938

2,108,862

UNITED STATES PATENT OFFICE 2,108,862

HALOGENATED THICK BOILING STARCH

Ralph Waldo Kerr, Riverside, Ill., assignor to International Patents Development Company, Wilmington, Del., a corporation of Delaware No Drawing. Application January 14, 1935, Serial No. 1,604

27 Claims. (Cl. 127—33)

This invention relates to the modification of starch, particularly corn starch, although the invention is not limited thereto.

It is known that starch can be modified by treatment with the halogens, chlorine being most commonly used; and there have been several processes devised for modifying starches by the use of this agent. In all cases, so far as I am aware, the chlorination or halogenation of starch has been for the purpose of, and has resulted in making the starch thin boiling, when cooked to a paste as compared with raw starch, that is decreasing the viscosity of the paste while hot. In fact chlorination is one of the recognized methods of making certain types of thin boiling starch.

The present invention is based upon the discovery that under certain conditions. which I have found can be brought under control, it is possible by the use of a halogen or a halogen containing substance in an acid state, as a modifying agent, to make starch thicker boiling than the raw starch treated, that is, to increase the viscosity of the paste instead of decreasing it.

The process may be manipulated so as to give a modified starch which will be cooked to a thick paste but which if allowed to stand, will set to a relatively thin paste, for example, to a viscosity lower than the viscosity of raw starch which has been pasted and allowed to set. This product will be referred to herein as "thick boiling thin setting starch." When the treatment is applied to corn starch, and the starch pasted, the paste while hot will have a viscosity approximating that of pastes made from potato, sago and other root starches.

The process, however, may be manipulated so as to give a product which will cook up to a thick paste, as in the case of the first mentioned product, but which on setting will have a relatively high viscosity, a viscosity higher, for example, than the viscosity of a paste at this stage made from raw starch. The product after standing may set to a firm, jelly-like consistency. This second product will be called herein "thick boiling thick setting starch."

These products, and more particularly the second named product, may be advantageously added to raw starch, in order to increase the thick boiling and water absorptive properties of the raw starch.

The first mentioned product may, if desired, be further converted, for example, by the ordinary hydrolyzing acids, sulphuric, hydrochloric or nitric, to produce a thin boiling starch which will congeal less than the ordinary thin boiling starches of the same fluidity.

The novel starch products referred to above may be used as adhesives, sizes, or for other purposes for which modified starches are used.

In measuring viscosities comparison will be made between the modified starch under consideration and raw starch under like paste conditions. By "hot paste viscosity" is meant the viscosity of the paste, while still hot, in accordance with a common standardizing test known as the Scott test. By "cold paste viscosity" is meant the viscosity of the paste after it has been allowed to cool and set, as measured by a Stormer viscometer. The term "normal viscosities for raw starch" as applied to hot and cold pastes means the hot or cold paste viscosity, as the case may be, which raw starch containing no thinning agent would have had, if, instead, of being halogenated, it had been cooked to a paste, allowed to set and tested for viscosity, before and after setting, in the same manner and under the same conditions as the halogenated starches referred to, for example, in accordance with the tests to be hereinafter described. Actually most commercial starches contain small quantities of chemicals, for example sulphur dioxide, which have some tendency to thin the starch, particularly when the starch is dried or held in process for any considerable period of time. The term "normal viscosities for raw starch" is to be understood as intending the viscosities of the starch taken from the starch filters, for example, before thinning action has taken place to any appreciable extent.

In making the Scott test 15 grams of starch containing 12% of moisture is mixed with 280 cubic centimeters of distilled water and heated on a constant temperature bath at 211°–212° F. for fifteen minutes and stirred for the first five minutes, for ten seconds at the end of ten minutes, and for fifteen seconds at the end of twelve and three-fourths minutes; and then transferred to a cup, heated to the temperature of the bath, holding 200 cubic centimeters, provided with an overflow to keep the cup full, and with an orifice which is immediately open at the end of the fifteen minute period. The orifice is of such size that when raw starch is treated, as above described, it will require on the average from 85 to 95 seconds for the first 50 cubic centimeters to pass through the orifice. A starch having such a viscosity is spoken of as having a Scott test of 85 to 95.

If paste made as above from raw corn starch is placed in a water bath at 77° F. for three hours and then tested in a Stormer viscometer which provides for rotation of a cylinder in the material actuated in this case by a 400 gram weight, it will require, on the average, about 100 seconds for the Stormer cylinder to make 50 revolutions; in this case the Stormer or cold paste viscosity is said to be 100.

*Example 1.—Method of making thick boiling thin setting starch:* One liter of a corn starch and water mixture of a density of 17° Baumé, made, for example, by breaking up and suspending in water washed starch taken from the usual washing filters, is heated to about 125° F. Chlorine gas is introduced into the suspension at such a rate that 2.4 grams of gas, approximately, will be absorbed in twenty minutes, the temperature of 125° F. being maintained during the operation. At the end of this period the introduction of chlorine is discontinued, but the temperature of 125° F. is maintained for an additional twenty minutes.

The batch is then partially neutralized, preferably by a mixture of sodium hydroxide and sulphite of soda to a pH of about 5.0. The modified starch product after neutralization will contain a slight excess of sulphur dioxide, for example 0.005%.

The suspension is then filtered, washed and dried. The amount of chlorine used will vary with the concentration of $SO_2$ and other oxidizable solubles present in the raw starch. A common $SO_2$ concentration in washed corn starch is about 0.015%.

In place of using chlorine gas, liquid chlorine could be used. It is also possible to use a halogen containing substance in an acid state such as hyperchlorous acid or an acid mixture of hyperchlorites and hyperchlorous acid; but if the maximum thick boiling effect is desired, pure chlorine in gaseous or liquid form is much to be preferred and probably necessary.

The density of the suspension is largely a matter of convenience and economy. The suspension should be as thick as can be conveniently handled in order to reduce the cost of filtering and drying.

The termperature should be as high as practicable, in order to hasten the reactions, but if too high, that is, if much above 125° F., the reaction is likely to ge out of control and the desired thick boiling characteristic lost.

The time factor is of primary importance because if the reaction is allowed to proceed too far, the thick boiling characteristics desired in the product will disappear entirely, and the starch become very markedly thin boiling. That is to say, this invention is based upon the discovery that when starch is treated with a halogen, in properly regulated amounts and at temperatures not too high, the viscosity curves of the paste, measured by both the Scott and Stormer tests, rise very sharply during the first part of the reaction and then decline to a point which, if the reaction is continued for the usual period for making thin boiling starches, is far below the normal for raw starch. It follows, therefore, that either by adding the stated quantity of halogen over a much longer period of time, or adding the halogen so that it is absorbed at the stated rate, but allowing the reaction to continue thereafter for a much longer period than stated, conditions are created which favor secondary reactions leading to the thinning of the starch.

It will be understood that the duration of the treatment, prior to neutralization, may be varied in accordance with the increase in paste viscosities desired and in accordance with permissible variations in time and in quantity and type of halogenating agent used. The above formula is intended to be illustrative and typical. It is the best method, so far as I am aware, for obtaining maximum hot paste viscosity, with low cold paste viscosity.

A starch made in accordance with the preferred formula given above, will have a Scott test many times greater than normal, for example 500 to 1000 as compared with 85 to 95 which may be regarded as normal for raw starch. Its Stormer test will be about 50 to 75 as compared with a raw starch Stormer of 100.

*Example 2.—Method of making thick boiling thick setting starch:* In the manufacture of this product the reaction is controlled so as to arrest the conversion at a point where both Scott and Stormer viscosity curves are close to their peaks. The Stormer curve goes out of the thick boiling range before the Scott curve, that is, its peak is reached first. Therefore, for the second product, the reaction must be gentler or less prolonged. In order to assure better control bromine is used, preferably, in place of chlorine and lower converting temperatures. To give an example: One liter of 17° Baumé starch is heated to 75° F., and bromine is introduced, drop by drop, until a total of about 2.25 grams have been added. The batch is kept at 75° F. with gentle stirring for forty-five minutes. It is then neutralized to a pH of 5.2 with sodium hydroxide and is filtered, washed and dried.

This product will show a Scott test substantially as high as the first product, but it will have a Stormer test of approximately 250. It will be understood that by control of the process, the Scott and Stormer viscosities may be varied. In the example last given the intention is to produce a product which will be as thick boiling as possible consistent with high viscosity and water absorption at the setting stage.

*Example 3.—Method of making thin boiling starch:* The first described product, the thick boiling, thin setting starch, is taken from the process just before the neutralization step and is acidified with sulphuric, hydrochloric or nitric acid in quantities proper for making thin boiling starch; the amount of the acid depending upon the characteristics desired in the ultimate product. To give an example: To one liter of 17° Baumé starch, halogenated as above described in Example 1, is added sulphuric acid enough to increase the titre to 10 cubic centimeters. By titre is meant the number of cubic centimeters of a one tenth normal sodium hydroxide solution required to render 10 cubic centimeters of starch-free liquor neutral to phenol phthalein. The starch so acidified is treated at a temperature of 125° F. for ten hours. The product will be about a 40 fluidity thin boiling starch, as the term fluidity is known to the trade, but will be less congealing as the paste cools than the products of this fluidity made by hydrolyzing raw corn starch with acid alone.

*Example 4.—Blending with raw starch:* Raw corn starch is made, to some extent, thin boiling by its method of manufacture which involves an acid treatment followed by prolonged drying of the starch with a small content of acid. That is, if the starch in the corn could be conceived as removed without processing, it would cook to a thicker paste and absorb more water than the corn starch produced by present day methods. Commercial corn starch may be made less thin boiling by mixing therewith a portion of the second product described above i. e. the thick boiling thick setting product of Example 2. By adding to and intimately mixing with commercial starch 10% to 20% of such thick boiling thick setting starch, the starch will be made thicker boiling and capable of absorbing more water without adding greatly to the cost of its production. By commercial starch or commercially produced starch is intended starch made by methods which bring about, incidentally, a thinning of the starch to some slight extent but the term excludes any starch which is intentionally treated or modified to bring about a substantial thinning.

In this application, the terms halogenation, chlorination, etc., have not been used necessarily in the most strict chemical sense, that is, to denote an additive reaction between substrate and halogen, but rather in the broader sense of treating the starch with halogen.

I have described preferred products and processes as illustrating the application of the invention to actual practices. It is to be understood, however, that the invention is not to be considered as limited to these particular embodiments. It is my intention, in fact, to cover all modifications and variations within the scope of the appended claims.

I claim:

1. A halogenated starch having a hot paste viscosity substantially above the normal for raw starch and a cold paste viscosity below normal.

2. A halogenated starch having hot and cold paste viscosities both substantially above the normal viscosities for raw starch.

3. A halogenated corn starch having a hot paste viscosity substantially above the normal for raw starch and a cold paste viscosity below normal.

4. A halogenated corn starch having hot and cold paste viscosities both substantially above the normal viscosities for raw starch.

5. A halogenated corn starch having a hot paste viscosity measured by the Scott test of from 500 to 1000.

6. A halogenated corn starch having a hot paste viscosity measured by the Scott test of substantially more than 90, and a cold paste viscosity measured by the Stormer test of less than 100.

7. A halogenated corn starch having a hot paste viscosity measured by the Scott test of substantially more than 90, and a cold paste viscosity measured by the Stormer test of 50 to 75.

8. A halogenated corn starch having a hot paste viscosity measured by the Scott test of substantially more than 90 and a cold paste viscosity measured by the Stormer test of substantially more than 100.

9. A halogenated corn starch having a hot paste viscosity measured by the Scott test of substantially more than 90 and a cold paste viscosity measured by the Stormer test of approximately 250.

10. Method of making a thick boiling starch which consists in subjecting the starch in water to heat and the action of a halogen or halogen containing substance in an acid state; and arresting the reaction at a stage at which the hot paste viscosity of the product is above normal.

11. Method of making a thick boiling starch which consists in subjecting the starch in water to heat and the action of a halogen or halogen containing substance in an acid state; and arresting the reaction at a stage at which the hot paste viscosity of the product is above normal and the cold paste viscosity is below normal.

12. Method of making a thick boiling starch which consists in subjecting the starch in water to heat and the action of a halogen or halogen containing substance in an acid state; and arresting the reaction at a stage at which the hot and cold paste viscosities are both above normal.

13. Method of making a thick boiling starch which consists in subjecting the starch in water to a temperature not substantially in excess of 125° F.; and treating the same at this temperature with a halogen or halogen containing substance in an acid state and arresting the treatment while the starch is thick boiling.

14. Method of making a thick boiling starch which consists in subjecting the starch in water at a density of approximately 17° Baumé to a temperature not substantially in excess of 125° F.; and treating the same at this temperature with a halogen or halogen containing substance in an acid state and arresting the treatment while the starch is thick boiling.

15. Method of making a thick boiling starch which consists in subjecting the starch in water at a density of approximately 17° Baumé to a temperature not substantially in excess of 125° F.; treating the same with a halogen; and adding a neutralizing agent to the suspension to arrest the reaction at a stage at which the hot paste viscosity of the product is above normal.

16. Method of making a thick boiling starch which consists in subjecting the starch in water at a density of approximately 17° Baumé to a temperature not substantially in excess of 125° F.; treating the same with a halogen; and adding a neutralizing agent to the suspension to arrest the reaction at a stage at which the hot paste viscosity of the product is above normal, and the cold paste viscosity is below normal.

17. Method of making a thick boiling, thick setting starch which consists in subjecting the starch in water at a density of approximately 17° Baumé to a temperature not substantially in excess of 125° F.; treating the same with a halogen; and adding a neutralizing agent to the suspension to arrest the reaction at a stage at which the hot and cold paste viscosities are both above normal.

18. Method of making corn starch thick boiling and thin setting which consists in treating the starch in accordance with the following formula: introducing into one liter of a starch and water mixture at approximately 17° Baumé and at a temperature of approximately 125° F., chlorine at such a rate that 2.4 grams is absorbed during approximately twenty minutes; allowing the batch to stand for approximately twenty minutes; then neutralizing it to a pH of about 5.0.

19. Method of making corn starch thick boiling and thick setting which consists in treating the starch in accordance with the following formula: introducing into one liter of a startch and water mixture of approximately 17° Baumé heated to approximately 75° F. 2.25 grams of bromine; stirring the mixture and maintaining the temperature at 75° F. for about forty-five minutes; then neutralizing the batch to a pH of about 5.2.

20. Method of making thin boiling corn starch which comprises halogenating raw starch, discontinuing the introduction of the halogen at a stage at which the hot paste viscosity is above and the cold paste viscosity below normal; and then further modifying the starch by heating it in the presence of a hydrolyzing acid.

21. Method of making a thick boiling starch which comprises heating the starch in suspension in water with a halogen in a gaseous or liquid state introduced into the starch suspension little by little, and stopping the reaction while the starch is at the thick boiling stage.

22. Method of making a thick boiling starch which comprises heating the starch in suspension in water with chlorine in a gaseous or liquid state introduced into the starch suspension little by little, and stopping the reaction while the starch is at the thick boiling stage.

23. Method of making thick boiling starch comprising heating the starch in suspension in water at a temperature not substantially in excess of 125° F. with chlorine in a gaseous or liquid state introduced into the starch suspension little by little, and stopping the reaction while the starch is at the thick boiling stage.

24. Method of making a thick boiling, thick setting starch which comprises heating the starch in suspension in water in the presence of a halogen in a substantially pure state introduced into the starch suspension little by little, and stopping the reaction while the starch is at a stage to be both thick boiling and thick setting.

25. Method of making a thick boiling, thick setting starch which comprises heating the starch in suspension in water in the presence of bromine in a substantially pure state introduced into the starch suspension little by little, and stopping the reaction while the starch is at a stage to be both thick boiling and thick setting.

26. Method of making a thick boiling, thick setting starch which comprises heating the starch in suspension in water at a temperature not substantially in excess of 75° F. with a halogen in a substantially pure state, and stopping the reaction while the starch is at a stage to be both thick boiling and also thick setting.

27. Method of making thin boiling starch which comprises treating the starch in suspension in water with a halogen in a gaseous or liquid state introduced into the starch suspension little by little; stopping the reaction while the starch is at a stage to be thick boiling; then acidifying the material and producing further modification in the starch by the application of heat.

RALPH WALDO KERR.